(12) United States Patent
Braganza et al.

(10) Patent No.: US 11,473,982 B2
(45) Date of Patent: Oct. 18, 2022

(54) BROAD BANDWIDTH GRADED INDEX MULTIMODE OPTICAL FIBER FOR DISTRIBUTED TEMPERATURE SENSING IN THE 1550 NM REGION

(71) Applicant: OFS FITEL, LLC, Norcross, GA (US)

(72) Inventors: David D Braganza, Southbridge, MA (US); Jie Li, Unionville, CT (US); Xiaoguang Sun, West Hartford, CT (US)

(73) Assignee: OFS FITEL, LLC, Norcross, GA (US)

( * ) Notice: Subject to any disclaimer, the term of this patent is extended or adjusted under 35 U.S.C. 154(b) by 1196 days.

(21) Appl. No.: 15/909,379

(22) Filed: Mar. 1, 2018

(65) Prior Publication Data
US 2018/0252596 A1 Sep. 6, 2018

Related U.S. Application Data

(60) Provisional application No. 62/465,964, filed on Mar. 2, 2017.

(51) Int. Cl.
| | |
|---|---|
| *G01K 11/32* | (2021.01) |
| *G02B 6/028* | (2006.01) |
| *G02B 6/42* | (2006.01) |
| *G01K 11/324* | (2021.01) |

(52) U.S. Cl.
CPC ............ *G01K 11/32* (2013.01); *G02B 6/0281* (2013.01); *G02B 6/4298* (2013.01); *G01K 11/324* (2021.01); *G02B 6/0288* (2013.01); *G02B 6/4208* (2013.01)

(58) Field of Classification Search
CPC .... G01K 11/32; G01K 11/324; G02B 6/0281; G02B 6/4298; G02B 6/0288; G02B 6/4208
See application file for complete search history.

(56) References Cited

U.S. PATENT DOCUMENTS

| | | | |
|---|---|---|---|
| 6,163,554 A * | 12/2000 | Chang | H01S 3/302 372/6 |
| 7,421,174 B2 | 9/2008 | Fleming, Jr. et al. | |
| 9,804,325 B2 * | 10/2017 | Balemarthy | G02B 6/0288 |
| 2010/0284060 A1 * | 11/2010 | Nicholson | H01S 3/0675 359/334 |

(Continued)

*Primary Examiner* — Brandi N Hopkins
*Assistant Examiner* — Janice M Soto
(74) *Attorney, Agent, or Firm* — Sam S. Han, Esq.

(57) ABSTRACT

Disclosed herein is a method for measuring temperature via distributed temperature sensing comprising transmitting light through a fiber optic cable; detecting backscattered light in the fiber optic cable, wherein the backscattered light comprises an anti-Stokes band and a Stokes band; calculating a ratio between an intensity of the anti-Stokes band and an intensity of the Stokes band; and using the calculated ratio to determine a temperature being sensed in the fiber optic cable; wherein the fiber optic cable comprises, from the center to the periphery; a central core having a refractive index that decreases progressively from a center of the central core to an edge of the core, wherein the refractive index follows an alpha profile; wherein a bandwidth-length product of the multimode optical fiber has a value greater than 2000 MHz-km at 1550 nm.

8 Claims, 3 Drawing Sheets

(56) References Cited

U.S. PATENT DOCUMENTS

| | | | |
|---|---|---|---|
| 2013/0322837 A1* | 12/2013 | Bickham | G02B 6/0281 385/124 |
| 2015/0260588 A1* | 9/2015 | Babin | G01K 11/32 374/161 |
| 2018/0058982 A1* | 3/2018 | Hartog | G01D 5/35387 |

* cited by examiner

BROAD BANDWIDTH GRADED INDEX MULTIMODE OPTICAL FIBER FOR DISTRIBUTED TEMPERATURE SENSING IN THE 1550 NM REGION

CROSS-REFERENCE TO RELATED APPLICATIONS

This application claims priority to U.S. Provisional Patent Application Ser. No. 62/465,964, filed Mar. 2, 2017, which is hereby incorporated by reference in its entirety.

BACKGROUND

The embodiments described herein relate in general to the field of fiber optics. More specifically, the embodiments described herein relate to distributed temperature sensing (DTS) systems.

Optical fibers have been used in communication systems to transmit information. Recently, optical fibers have been used for distributed sensing purposes in that measurements can be made throughout the length of a fiber optic cable. Such a technology has a variety of advantages over traditional and discrete sensors. For example, distributed fiber optic sensors can sense physical parameters over long distances while being immune to electromagnetic interferences and providing safe operation (for example, no electric sparks are present, and thus can be used in a hazardous area). In such a manner, measurements can be achieved at distances of 10 kilometers or more. The installation is simpler in that there is no need for multiple wires to transmit data over such great distances. A single fiber optic distributed sensor can be equivalent to thousands of point sensors. Various techniques can be used to increase the range and sensitivity of such a distributed sensor.

SUMMARY

Embodiments are directed to an optical fiber optimized for use in a distributed temperature sensing system. The system includes a multimode, graded index optical fiber. The fiber comprises, from the center to the periphery: a central core and a cladding. The central core has a refractive index that decreases progressively from a center of the central core to an edge of the core. The refractive index of the central core follows an alpha profile—where the value of alpha defines the shape of the profile. The cladding has a refractive index that is smaller than a minimum refractive index of the central core. The central core has a value of alpha in the range of 1.70 to 1.98. The bandwidth-length of a fiber optic cable when measured at 1550 nm is approximately 2000 MHz-km or greater.

Embodiments are further directed to a system for measuring temperature via distributed temperature sensing. The system includes a first fiber optic cable and a first coupling system coupled to the first fiber optic cable. The system further includes a second fiber optic cable. The first coupling system includes a first coupler coupled to the first fiber optic cable, a second coupler coupled to the second fiber optic cable, and a first optical isolator coupled between the first coupler and the second coupler.

Embodiments are further directed to a method for measuring temperature via distributed temperature sensing. The method comprises transmitting light through a first fiber optic cable. The first fiber optic cable is coupled to a second fiber optic cable. The method further comprises detecting backscattered light. The backscattered light comprises an anti-Stokes band and a Stokes band in the first fiber optic cable. The method further comprises calculating a ratio between an intensity of the anti-Stokes band and an intensity of the Stokes band. The method further comprises using the calculated ratio to determine a temperature being sensed in the first fiber optic cable or the second fiber optic cable. The first fiber optic cable is coupled to the second fiber optic cable via a first coupler coupled to the first fiber optic cable, a second coupler coupled to the second fiber optic cable, and an optical isolator coupled between the first coupler and the second coupler. The optical isolator is configured to remove a Stokes signal traveling from the first fiber optic cable to the second fiber optic cable.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
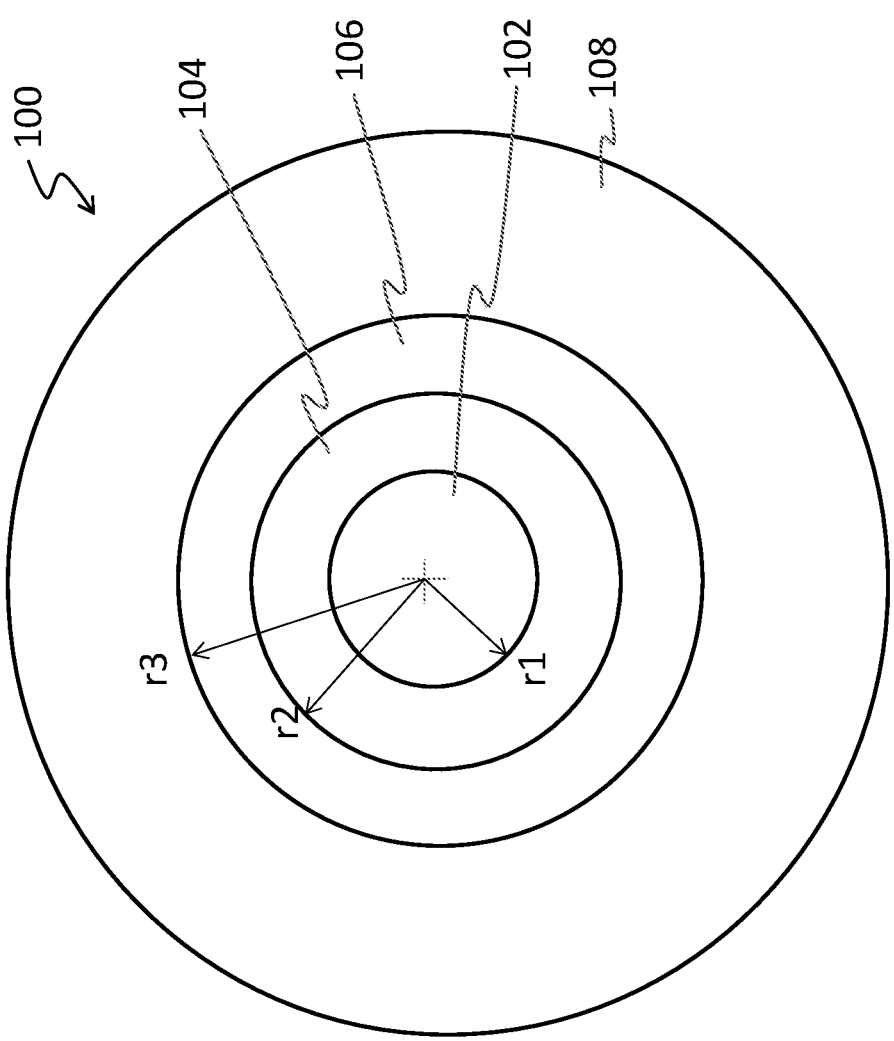
FIG. 1 is a cross section of an exemplary fiber of one or more embodiments.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Distributed temperature sensing (DTS) relies on the fact that the physical environment (including temperature and pressure) can affect fibers and locally change the characteristics of light transmission in the fiber. In general, fiber optics work by transmitting light through the fiber. DTS operates by transmitting a pulse of light through the fiber and measuring backscattered light. In an embodiment, the fiber comprises a central core having a refractive index that decreases progressively from a center of the central core to an edge of the core, wherein the refractive index follows an alpha profile. Disposed on the core is a cladding having refractive index smaller than a minimum refractive index of the central core. The central core has a value of alpha in the range of 1.70 to 1.98. The bandwidth-length of a fiber optic cable when measured at 1550 nm is approximately 2000 MHz-km or greater.

Thermal effects on the fiber induce lattice oscillations. When light impinges on these thermally excited molecular oscillations, an interaction occurs between the light particles and the electrons of the molecule. Light scattering thus occurs in the optical fiber. This scattering is called Raman scattering. The scattered light undergoes a spectral shift by an amount equivalent to the resonant frequency of the lattice oscillation. The light scattered back in the fiber has three different wavelengths: Rayleigh scattering at the wavelength of the light source (approximately 1550 nm); a Stokes band from photons shifted to a lower frequency than the frequency corresponding to the light source (approximately 1650 nm); and an anti-Stokes band, with photons shifted to a longer frequency than that of the Rayleigh scattering (approximately 1450 nm). In general, the intensity of the anti-Stokes band is temperature dependent, while the Stokes band is not as temperature dependent. The temperature of the optical fiber at a certain point can be determined by finding a ratio of the intensity of the anti-Stokes band to the intensity of the Stokes band.

To obtain the temperature measurement, a variety of techniques have been used. One technique is optical time domain reflectometry (OTDR). In OTDR, a pulsed light source is used and the location of the temperature is identified by a calculation of the pulse's round trip time to the distance under test. Another used technique is optical frequency domain reflectometry (OFDR). In OFDR, a modulated light source is used and the position of a temperature event is calculated by applying an inverse Fourier transform of the fiber's transfer function, or the frequency response.

While a DTS system uses light transmitted at approximately 1550 nm, a typical DTS system transmits light using conventional multimode (MM) optical fibers that are designed for data communication, with light at wavelengths of 850 nm or 1300 nm, the typical wavelengths of data communication. However, at such wavelengths, the bandwidth-length product of a conventional fiber is significantly lower.

A bandwidth-length product is defined as the product of the length of a fiber optic link and the maximum signal bandwidth. A lower bandwidth-length product will cause larger pulse broadening over a long sensing length and result in an inferior spatial resolution if the fiber is used for DTS at 1550 nm.

For example, if the bandwidth-length product of a graded index (GI) multimode (MM) fiber is approximately 200 MHz-km at 1550 nm (which corresponds to approximately 5 nanoseconds (ns) of broadening per kilometer (km)), the worst pulse broadening due to the fiber's low bandwidth-length product is about a total of 100 ns in a 10 kilometer long sensing fiber. Of that 100 nanoseconds (ns) total, 50 ns is contributed by the probe light and 50 ns is contributed by the scatter light being measured. This corresponds to a spatial resolution of approximately 10 meters. A higher spatial resolution in a DTS system actually means the system is less capable of detecting events that are spatially small. This can impose a challenge for applications where resolution is desired to be around 1 meter, thus limiting the reach of DTS as a distributed sensor.

In some embodiments, a solution to the above-described issue is to redesign the GI MM fibers by shifting the intended operating wavelength of the fiber from the 850 or 1300 nm region to the 1550 nm region. In particular, the index profile of the fiber can be optimized to achieve a higher bandwidth-length product in the region from 1450 nm (the anti-Stokes wavelength) to 1650 nm (the Stokes wavelength), centered at approximately 1550 nm (the pump wavelength).

An optical fiber typically comprises a glass fiber surrounded by one or more coating layers. The glass fiber is typically referred to as the optical fiber core, which is the portion that transmits an optical signal. An optical cladding surrounds the fiber and serves to confine the optical signal to the core. The refractive index of the core, $n_c$, is typically greater than the refractive index of the optical cladding, $n_g$.

Generally speaking, two main categories of optical fibers exist: multimode fibers and single-mode fibers. In a multimode fiber, for a given wavelength, several optical modes are propagated simultaneously along the optical fiber. In a single-mode optical fiber, the signal propagates in a fundamental mode that is guided in the fiber core, while the higher-order modes are attenuated.

The typical diameter of a single-mode optical fiber is 2 to 25 micrometers (microns). The core of a multimode optical fiber typically has a diameter of between about 20 to 800 microns, preferably 30 to 200 microns, with the cladding having a diameter of 50 to 1000 microns, preferably 80 to 300 microns. In contrast, the core of a single-mode fiber has a diameter of between about 2 to 25 microns, preferably 3 to 15 microns.

FIG. 1 shows cross-section of an exemplary graded index multimode optical fiber 100 of one or more embodiments of the present invention. Optical fiber 100 has a central core 102, a cladding 104 generally having a constant index profile that may or may not be similar to the index profile of the outer cladding 108. Some embodiments include a trench 106 that has a refractive index difference $n_t$ with respect to outer cladding 108. This refractive index difference $n_t$ may be a function of radius r where r corresponds to the radial position with respect to the center of the optical fiber. In some embodiments, the refractive index of the trench 106 is lower than that of the cladding region. In such an embodiment, the purpose of trench 106 is to make the optical fiber less sensitive to bending. Other regions, such as a coating, a buffer tube, a strength member, an inner jacket, an outer jacket, and the like, can also be present, but are not illustrated in FIG. 1.

Figure 2:
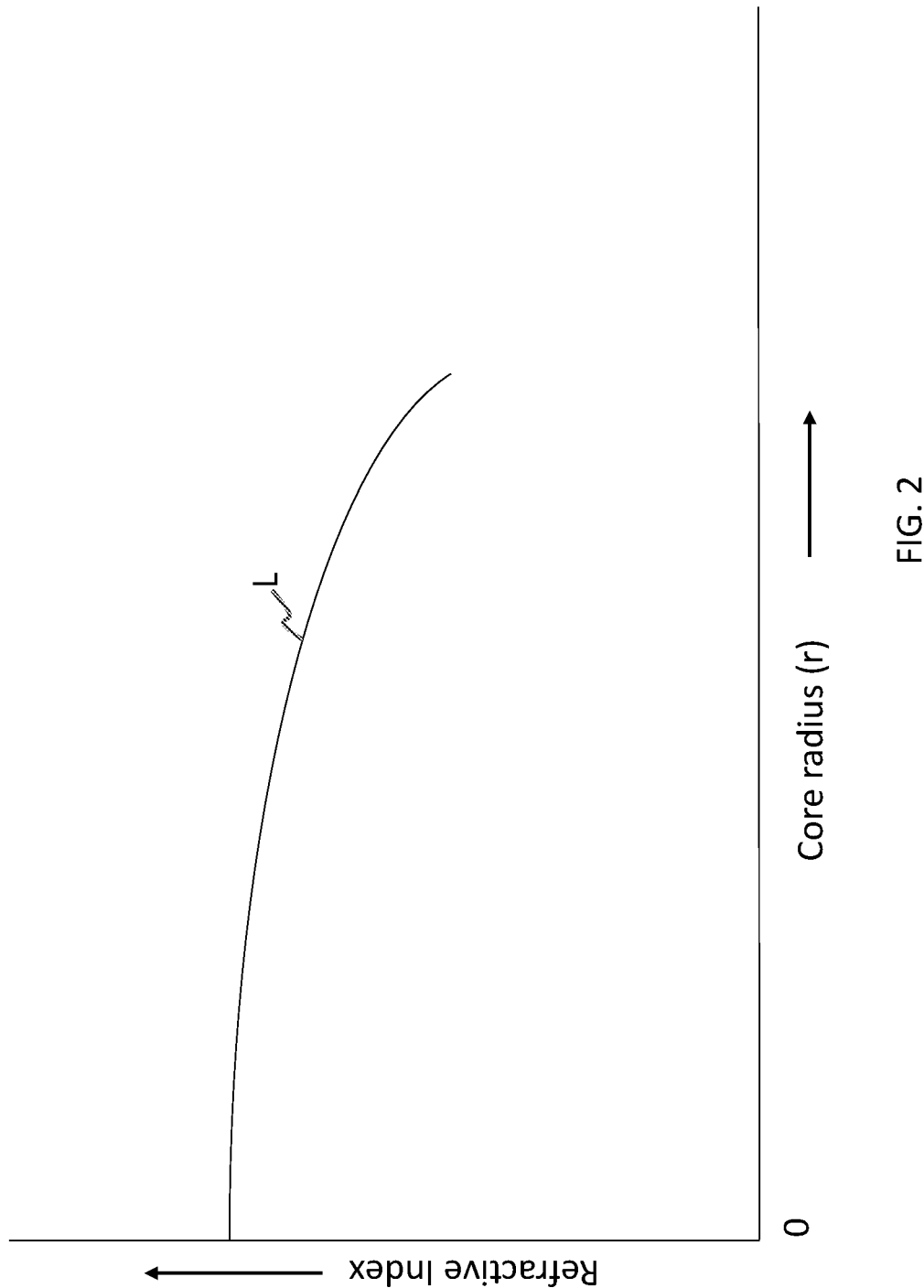
FIG. 2 is a graph illustrating a refractive index profile of the core of an exemplary embodiment.

The refractive index profile of an optical fiber can be classified according to the graphical appearance of the function that associates the refractive index with the radius of the optical fiber. An exemplary refractive index profile is shown in FIG. 2. Conventionally, the distance, r, to the center of the optical fiber is shown on the x-axis, and the difference between the refractive index (at radius r) and the refractive index of the cladding is shown on the y-axis. The refractive index profile is referred to as a "step" profile, "trapezoidal" profile, "alpha" profile, or "triangular" profile for graphs having the respective shapes of a step, a trapezoid, an alpha-gradient, or a triangle. These curves are generally representative of the optical fiber's theoretical or set profile.

To reduce intermodal dispersion, a multimode optical fiber has a core with a refractive index that decreases progressively from the center of the optical fiber to the core/cladding boundary. A graded-index (GI), also known as an alpha-index profile, can be described by a relationship between the refractive index value n and the distance, r, from the center of the optical fiber according to the following equation:

The refractive index profile of a graded index (GI) multimode (MM) optical fiber can be characterized as follows:

$$n_c(r) = n_0[1 - 2\Delta(r/\alpha)^\alpha]^{1/2}$$

where $$\Delta = (n_c^2 - n_0^2)/2n_c^2$$

and $n_0$ is the refractive index of the core at r=a

With respect to FIG. 2, a refractive index profile of the core portion of a multimode graded-index fiber is presented.

FIG. 2 is a graph in which the x-axis represents the distance from the center of the optical fiber and the y-axis represents the refractive index. Line L represents the refractive index profile of an exemplary core that varies from 1.70 to 1.98, preferably 1.70 to 1.90, preferably 1.72 to 1.88, and more preferably 1.75 to 1.85. The value of alpha is the profile parameter of the core shape and defines the shape of the graded refractive index profile.

A multimode fiber with a graded index (such as an alpha profile) has a core profile with a rotational symmetry such that, along any radial direction of the optical fiber, the value of the refractive index decreases continuously from the center of the fiber's core to its periphery. When a multimode signal propagates in a graded-index core, the different optical modes experience different propagation mediums because of the varying refractive indices. This, in turn, affects the propagation speed of each optical mode differently.

A value of $\alpha$ of 2.0 has been used in the past. However, that value of $\alpha$ is optimized for light in the wavelength range of 850 to 1300 nm. As discussed above, optical fiber for use in DTS applications typically uses light in the wavelength of 1400 to 1700 nanometers (nm) in general and from 1450 nm to 1650 nm in particular.

To maximize the bandwidth in the wavelength range from 1400 nm to 1700 nm for use in DTS configurations, it has been found that the optimum value for $\alpha$ is approximately 1.70 to 1.98. In an exemplary embodiment, it has been found that the bandwidth-length product on a 50/125 acrylate coated, bend-insensitive optical fiber with an $\alpha$ of 1.70 to 1.98 has shown a bandwidth-length product of greater than 2000 MHz-km, which is a ten-fold increase from values of $\alpha$ of 2.0.

The concept of shifting the operating wavelength to achieve better performance for DTS applications can be applied to any GI MM waveguide designs with different doping materials and coatings.

The fiber of embodiments of the present invention can be manufactured by drawing from a preform using one of a variety of different methods. In some embodiments, a modified chemical vapor deposition (MCVD) technique is used. Other techniques such as plasma chemical vapor deposition (PCVD), vapor axial deposition (VAD), or outside vapor deposition (OVD) may also be used.

In some embodiments, a fiber be a bend-optimized, graded-index, multimode fiber that is bandwidth optimized at 1550 nm. In some embodiments, the core fiber is doped with germania ($GeO_2$), phosphorus pentoxide ($P_2O_5$), alumina ($Al_2O_3$), or a combination thereof, to raise the refractive index of the core, while the cladding is made from silica with no doping, or alternatively, made from silica with a dopant that reduces the refractive index relative to the refractive index of the core. A trench area may be doped with fluorine or with boron oxide to lower the refractive index of the trench. In other embodiments, the core is made from silica with no dopants, while the cladding is doped with fluorine or boron oxide ($B_2O_3$) to lower the refractive index of the cladding with respect to the core.

For fibers used in DTS applications, the core diameter is approximately 50 to 100 µm. The diameter of the cladding is approximately 80 to 200 µm. The diameter of the coating is approximately 100 to 500 µm. The numerical aperture (NA) is approximately 0.18 to 0.3 (when measured at 850 nm). The bandwidth-length of a fiber optic cable when measured at 1550 nm is approximately 2000 MHz-km or greater, preferably 2200 MHz-km or greater and more preferably 2500 MHz-km or greater.

Figure 3:
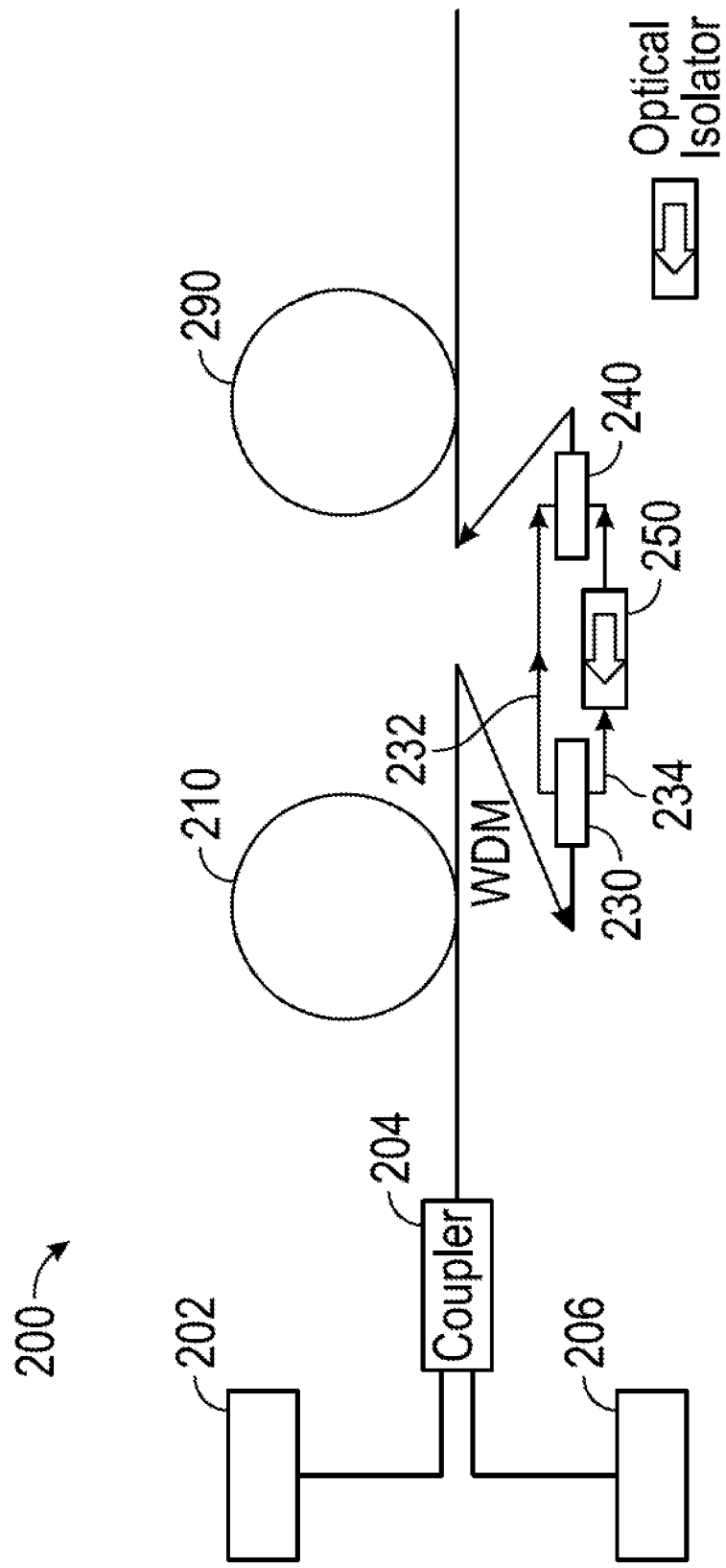
FIG. 3 is an exemplary depiction of a system that may be used in DTS applications.

The FIG. 3 is an exemplary depiction of a system that may be used in DTS applications. FIG. 3 is a block diagram that depicts an exemplary system 200 that includes a first sensing fiber optic cable 210 (hereinafter sometimes referred to as the first fiber optic cable 210) and a second sensing fiber optic cable 290 (hereinafter sometimes referred to as the second fiber optic cable 210). In an embodiment, the first sensing fiber optic cable 210 and/or the second sensing fiber optic cable 290 may comprise the aforementioned optical fiber (i.e., have core having an $\alpha$ value of 1.70 to 1.98 with a cladding that has a lower refractive index than the core). The lengths of the first fiber optic cable 210 can be the same or different from the length of the second fiber optic cable. In an embodiment, the length of the second fiber optic cable is typically larger than the length of the first fiber optic cable. In an embodiment, the length of the first fiber optic cable is at least 5 kilometers, preferably 5 to 14 kilometers, while the length of the second fiber optic cable is at least 15 kilometers, preferably 15 to 30 kilometers.

A light from a light source 202 is transmitted through sensing fiber optic cable 210 through coupler 204. The coupler 204 (e.g., a fiber optic coupler) is a device used in optical fiber systems with one or more input fibers and one or several output fibers. Light entering an input fiber can appear at one or more outputs and its power distribution is potentially dependent on the wavelength and polarization. Backscattered light from sensing fiber optic cable 210 is received through the coupler 204 and directed to a photodetector 206. Photodetector 206 converts the light signal into an electrical signal. The electrical signal is processed in a manner described above, where the ratio of various wavelengths of light are calculated to determine the temperature of at various distances from the light source. The processing can take place in any type of computing system (not shown) to which photodetector 206 is coupled. Light through sensing fiber optic cable 210 also travels through sensing fiber optic cable 290, to which the sensing fiber optic cable 210 is coupled.

Between first sensing fiber optic cable 210 and second sensing fiber optic cable 290 are a first wavelength division multiplexer (WDM) 230 coupled to first sensing fiber optic cable 210 and a second wavelength division multiplexer 240 that is coupled to second sensing fiber optic cable 290. Between wavelength division multiplexer 230 and wavelength division multiplexer 240 is an optical isolator 250. The combination of the first wavelength division multiplexer (WDM) 230 and the second wavelength division multiplexer 240 in conjunction with the optical isolator 250 and the optical fiber sections there between are sometimes referred to herein as a "WDM/isolator" combination. The WDM/isolator combination disposed between the first sensing fiber optic cable 210 and the second sensing fiber optic cable 290 is called the first WDM/isolator combination.

While not shown in the FIG. 3, the system may further comprise a third sensing fiber optic cable that is in optical communication with the second sensing fiber optic cable via a third coupler and a fourth sensing fiber optic cable that is in optical communication with the third sensing fiber optic cable via a fourth coupler. In an embodiment, a second WDM/isolator combination may be disposed between the second sensing fiber optic cable and the third sensing fiber optic cable. A third WDM/isolator combination may be disposed between the third sensing fiber optic cable and the fourth sensing fiber optic cable and so on to increase the distance over which temperatures can be determined.

In another embodiment, a third coupler is coupled to the second fiber optic cable and a fourth coupler is coupled to the third fiber optic cable. A second optical isolator is coupled between the third coupler and the fourth coupler.

Wavelength division multiplexing is a method of combining or separating multiple wavelengths of light in or out of a single strand of fiber into signals of different wavelengths. The wavelength-division multiplexer (WDM) multiplexes a number of optical carrier signals onto a single optical fiber by using different wavelengths (i.e., colors) of laser light. Multiplexing involves the simultaneous transmission of several signals along a single channel of communication. The optical isolator or optical diode is an optical component, which allows the transmission of light in only one direction. It is used to prevent unwanted feedback the WDM.

In system 200, WDM 230 is configured to separate the light from sensing fiber optic cable 210 into pump signal 232 and the Stokes signal 234. Pump signal 232 is transmitted to WDM 240 from where it is then transmitted to sensing fiber optic cable 220. The Stokes signal 234 is coupled to the optical isolator 250. WDM 230 also serves to re-combine backscattered signals from the sensing optical fiber optic cable 290 that are traveling to sensing fiber optic cable 210 that were split by WDM 240. WDM 240 is similarly configured, separating a backscattered signal traveling from sensing fiber optic cable 290 to sensing fiber optic cable 210 and re-combining signals from sensing fiber optic cable 210 to sensing fiber optic cable 290. As noted above, the combination of the WDMs 230 and 240 with the optical isolator 250 is referred to herein as a "WDM/isolator" combination. In an embodiment, the system may have a plurality of isolators, couplers or WDM/isolator combinations.

Optical isolator 250 is configured to remove the forward traveling Stokes signal, while allowing the backscattered signal (from sensing fiber optic cable 290 to sensing fiber optic cable 210) to pass. Removing the forward traveling Stokes signal greatly increases the range of the DTS because the forward traveling Stokes signal no longer will interfere with the other signals in sensing fiber optic cable 290.

It should be understood that system 200 shown in FIG. 3 may be extended to include multiple WDM/isolator configurations between lengths of fiber. In one exemplary embodiment, it has been found that placing a WDM/isolator configuration at a distance of 6 kilometers from the light source and another WDM/isolator configuration at a distance of 21 kilometers from the light source can result in a significant improvement in performance. In other words, by the range of accurate temperature detection can be increased by including a plurality of WDM/isolator configurations at regular or irregular intervals between the light source 220 and the point at which the temperature is to be determined. In an embodiment, the system 200 can include 1 or more WDM/isolator combinations, preferably 2 or more WDM/isolator combinations, and more preferably 3 or more WDM/isolator combinations.

The method comprises transmitting light through a first fiber optic cable. The first fiber optic cable is coupled to a second fiber optic cable. The method further comprises detecting backscattered light. The backscattered light comprises an anti-Stokes band and a Stokes band in the first fiber optic cable. The method further comprises calculating a ratio between an intensity of the anti-Stokes band and an intensity of the Stokes band. The method further comprises using the calculated ratio to determine a temperature being sensed in the first fiber optic cable or the second fiber optic cable. The first fiber optic cable is coupled to the second fiber optic cable via a first coupler coupled to the first fiber optic cable, a second coupler coupled to the second fiber optic cable, and an optical isolator coupled between the first coupler and the second coupler. The optical isolator is configured to remove a Stokes signal traveling from the first fiber optic cable to the second fiber optic cable.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for measuring temperature via distributed temperature sensing comprising:
    a first fiber optic cable;
    a second fiber optic cable;
    a first coupler coupled to the first fiber optic cable;
    a second coupler coupled to the second fiber optic cable; and
    an optical isolator disposed between the first coupler and the second coupler and in optical communication with the first coupler and the second coupler; wherein at least one of the first fiber optic cable or the second fiber optic cable comprises a multimode optical fiber including, from the center to the periphery:
        a central core having a refractive index that decreases progressively from a center of the central core to an edge of the core, wherein the refractive index follows an alpha profile such that the central core has a value of alpha in the range of 1.70 to 1.98; and
        a cladding having a refractive index smaller than a minimum refractive index of the central core; wherein a bandwidth-length product of the multimode optical fiber has a value greater than 2000

MHz-km at 1550 nm and the bandwidth-length product is highest within a region from 1450 nm to 1650 nm.

2. The system of claim 1, further comprising:
a light source configured to send a light through the first and second fiber optic cable;
a photodetector configured to convert received light into electrical signals; and
a computing unit configured to calculate a ration between an anti-Stokes band in the received light and a Stokes band in the received light to determine a temperature along a length of the first or second fiber optic cable.

3. The system of claim 1, wherein the first coupler is a first wavelength division multiplexer.

4. The system of claim 3, wherein the first wavelength division multiplexer is configured to separate a light signal from the first fiber optic cable into a pump signal and a Stokes signal.

5. The system of claim 4, wherein the second coupler is a second wavelength division multiplexer.

6. The system of claim 5, wherein, the optical isolator is configured to filter a Stokes signal traveling from the first fiber optic cable to the second fiber optic cable.

7. The system of claim 6, wherein the optical isolator is further configured to allow a backscattered signal to travel from the second fiber optic cable to the first fiber optic cable.

8. The system of claim 1, further comprising:
a third fiber optic cable;
a third coupler coupled to the second fiber optic cable;
a fourth coupler coupled to the third fiber optic cable; and
a second optical isolator coupled between the third coupler and the fourth coupler.

* * * * *